(12) United States Patent
Kong

(10) Patent No.: US 9,698,398 B2
(45) Date of Patent: Jul. 4, 2017

(54) SECONDARY BATTERY MODULE

(71) Applicant: SK INNOVATION CO., LTD., Seoul (KR)

(72) Inventor: Ming Zhe Kong, Daejeon (KR)

(73) Assignee: SK INNOVATION CO., LTD., Seoul (KR)

(*) Notice: Subject to any disclaimer, the term of this patent is extended or adjusted under 35 U.S.C. 154(b) by 26 days.

(21) Appl. No.: 14/646,318

(22) PCT Filed: Nov. 20, 2013

(86) PCT No.: PCT/KR2013/010570
§ 371 (c)(1),
(2) Date: May 20, 2015

(87) PCT Pub. No.: WO2014/081193
PCT Pub. Date: May 30, 2014

(65) Prior Publication Data
US 2015/0303425 A1 Oct. 22, 2015

(30) Foreign Application Priority Data
Nov. 20, 2012 (KR) .................. 10-2012-0131733

(51) Int. Cl.
H01M 6/46 (2006.01)
H01M 2/16 (2006.01)
H01M 2/10 (2006.01)

(52) U.S. Cl.
CPC ....... H01M 2/1653 (2013.01); H01M 2/1077 (2013.01); *H01M 2220/20* (2013.01)

(58) Field of Classification Search
CPC ............. H01M 2/1653; H01M 2/1077; H01M 2220/20
See application file for complete search history.

(56) References Cited

U.S. PATENT DOCUMENTS

| 6,379,837 | B1* | 4/2002 | Takahashi | ............... | H01M 2/08 429/120 |
| 2007/0037046 | A1* | 2/2007 | Takahashi | ............. | H01M 2/021 429/96 |

(Continued)

FOREIGN PATENT DOCUMENTS

| JP | 2004-071178 | 3/2004 |
| JP | 2006-172994 | 6/2006 |

(Continued)

OTHER PUBLICATIONS

Machine translation for Kokubo et al. (JP 2006-172994), obtained on Jan. 28, 2017.*

(Continued)

*Primary Examiner* — Eli Mekhlin
(74) *Attorney, Agent, or Firm* — IP & T Group LLP

(57) ABSTRACT

Disclosed is a secondary battery module including: a plurality of unit cells, at least one or more unit cells among the plurality of unit cells being stacked so as to be in surface contact with each other; and an adhesive pad disposed between contact surfaces of the stacked unit cells. The adhesive pad enhances adhesion between the unit cells to prevent electrical sparks or short-circuiting. Therefore, the secondary battery module is stable and reliable in operation performance and electrical properties.

8 Claims, 5 Drawing Sheets

(56) References Cited

U.S. PATENT DOCUMENTS

2009/0053585 A1* 2/2009 Nakazawa .......... H01M 2/1077
429/56
2012/0189890 A1* 7/2012 Mitsuda ................ H01G 11/10
429/94

FOREIGN PATENT DOCUMENTS

| JP | 2008-091206 | 4/2008 |
|----|-------------|--------|
| KR | 1020070096148 | 10/2007 |
| KR | 1020110107528 | 10/2011 |

OTHER PUBLICATIONS

Machine translation for Kim et al. (KR 10 2011 0107528 A), identified as Application No. 10-2010-026692, obtained on Jan. 27, 2017.*

* cited by examiner

SECONDARY BATTERY MODULE

CROSS REFERENCE TO RELATED APPLICATION(S)

This application is a national stage application of PCT/KR2013/010570 filed on Nov. 20, 2013, which claims priority of Korean patent application number 10-2012-0131733 filed on Nov. 20, 2012. The disclosure of each of the foregoing applications is incorporated herein by reference in its entirety.

TECHNICAL FIELD

The present invention relates to a secondary battery module.

BACKGROUND ART

A secondary battery is a battery that can repeatedly perform a charging operation of changing chemical energy into electric energy, and a discharging operation which is a reverse operation to the charging operation. Examples of the secondary battery include a nickel cadmium (Ni—Cd) battery, a nickel hydrogen (Ni-MH) battery, a lithium metal battery, a lithium ion (Ni-Ion) battery, and a lithium-ion polymer (Li-Ion Polymer) battery (hereinafter, abbreviated to LIPB).

A secondary battery is made up of an anode, a cathode, an electrolyte, and a separator, and it stores and generates electricity using a voltage difference between the cathode and the anode. The discharging operation involves transferring electrons from the cathode, having a higher voltage, to the anode, having a lower voltage, while generating electricity corresponding to a voltage difference between the cathode and the anode. Conversely, the charging operation is an operation of transferring electrons from the anode to the cathode. During the charging operation, an anode material receives electrons and lithium ions, and thus returns to a metal oxide state. That is, in a secondary battery, a charging current flows when metal atoms move from the anode to the cathode through the separator during the charging operation, and a discharging current flows when metal atoms move from the cathode to the anode during the discharging operation.

Lithium secondary batteries are classified into liquid electrolyte batteries and polymer electrolyte batteries according to the kind of electrolyte. A battery that uses a liquid electrolyte is referred to as a lithium ion battery and a battery that uses a polymer electrolyte is referred to as a lithium polymer battery. An outer covering of a lithium secondary battery may take various forms. For example, it may have a cylindrical shape, a prismatic shape, or a pouch shape. An electrode assembly in which an anode plate, a separator, and a cathode plate are stacked or wound in that order is disposed inside the outer covering of a lithium secondary battery.

Secondary batteries have been used in various fields such as IT products, vehicles, and energy storage and currently attract attention as a promising energy source. Secondary batteries for IT products are required to ensure long operation time and have a small and lightweight body. Meanwhile, secondary batteries for use in vehicles are required to be durable and have high output power and stability (i.e. being free from risk of explosion). On the other hand, secondary batteries used for energy storage may not be required to have highly advanced features. Research and development of lithium secondary batteries began in early 1970, and lithium ion batteries which use carbon as a cathode material instead of lithium were put into practical use in 1990. The lithium ion batteries having a life cycle of 500 times and featuring a short charging time of about 1 to 2 hours have showed the highest increase in sales among secondary batteries. Lithium ion batteries are advantageous in reducing a weight of products that use a battery because they are 30 to 40% lighter than nickel-hydrogen batteries. In addition, lithium secondary batteries have the highest unit cell voltage (for example, a voltage in the range from 3.0 V to 3.7 V) among various kinds of secondary batteries and have high energy density. Therefore, lithium secondary batteries are suitable for use in mobile devices.

Secondary batteries are generally used in the form of a battery module in which one or more unit cells is stacked. In this case, when there exists a gap between stacked unit cells due to deterioration in adhesion between the stacked unit cells or swelling of the stacked unit cells, electrical sparks are likely to occur between the stacked unit cells, which may result in ignition or explosion. Therefore, reliability in electrical properties of stacked secondary battery modules or stability in operation of devices that use the secondary battery modules may be deteriorated.

DISCLOSURE

Technical Problem

The present invention has been made keeping in mind the above problems occurring in the related art, and an object of the present invention is to provide a secondary battery module having a stable and reliable structure in which an adhesive pad is inserted between unit cells from one side of the secondary battery module.

Technical Solution

In order to accomplish the above object of the invention, one aspect of the invention provides a secondary battery module including: a plurality of unit cells, at least one or more unit cells among the plurality of unit cells being stacked so as to be in surface contact with each other; and an adhesive pad disposed between contact surfaces of the unit cells.

The adhesive pad may be made of a polymer.

The adhesive pad may be a double-sided adhesive tape.

The secondary battery module may further include a partition member disposed between the contact surfaces of the unit cells that are stacked.

The adhesive pad may be disposed on the contact surface of the unit cell so as to be in tight contact with the unit cell, and at least one surface of the adhesive pad which is to come into contact with the contact surface of the unit cell may have an anti-bubble hole that prevents air bubbles from being formed.

The anti-bubble hole may be present in a plural number and linearly extend in a lengthwise direction of the adhesive pad.

The anti-bubble hole may be present in a plural number and the anti-bubble holes may be distanced from each other in the contact surface of the unit cell.

The unit cell may have a first electrode terminal that protrudes from one side thereof and a second electrode terminal that is distanced from the first electrode terminal and formed on the same side from which the first electrode terminal protrudes.

The above and other objects, features and other advantages of the present invention will be more clearly understood from the following detailed description when taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Advantageous Effects

According to the present invention, reliability of adhesion between stacked unit cells that constitute a secondary battery module can be ensured.

In addition, the increased adhesion between unit cells in a secondary battery module prevents electrical sparks or short-circuiting between unit cells from occurring. Therefore, a secondary battery module that is stable and reliable can be provided.

In addition, since it is possible to prevent air from entering between stacked unit cells, risk of ignition or explosion of a secondary battery module can be prevented.

In addition, it is possible to increase precision of adhesion between stacked unit cells in a secondary battery module and prevent a gap between the unit cells, driving performance and operation reliability of a device that uses the secondary battery module can be improved.

BEST MODE

Figure 1:
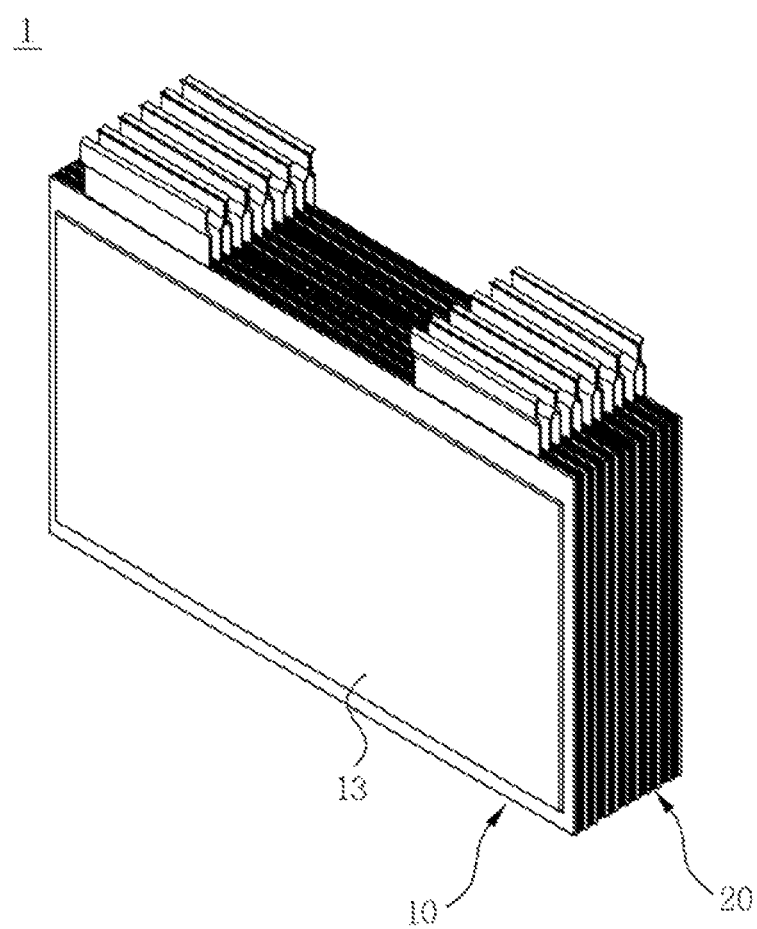
FIG. 1 is a perspective view illustrating as secondary battery module according to one embodiment.

The above and other objects, features and other advantages of the present invention will be more clearly understood from the following detailed description when taken in conjunction with the accompanying drawings. It should be noted that when denoting parts in the drawing by reference numerals, the same reference numerals will refer to the same or like parts throughout the drawings. It will also be understood that, although the terms "one side," "the other side, "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. In the following description of the present invention, detailed descriptions of known functions and components incorporated herein will be omitted when it may make the subject matter of the present invention unclear.

Hereinafter, preferred embodiments of the present invention will be described with reference to the accompanying drawings.

Figure 2:
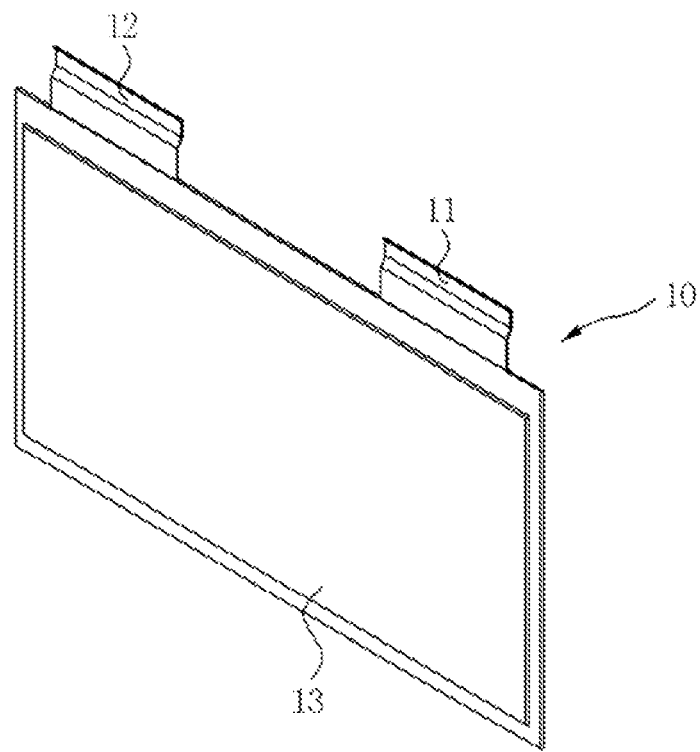
FIG. 2 is a perspective view illustrating a unit cell of the secondary battery module according to one embodiment.
Figure 3:
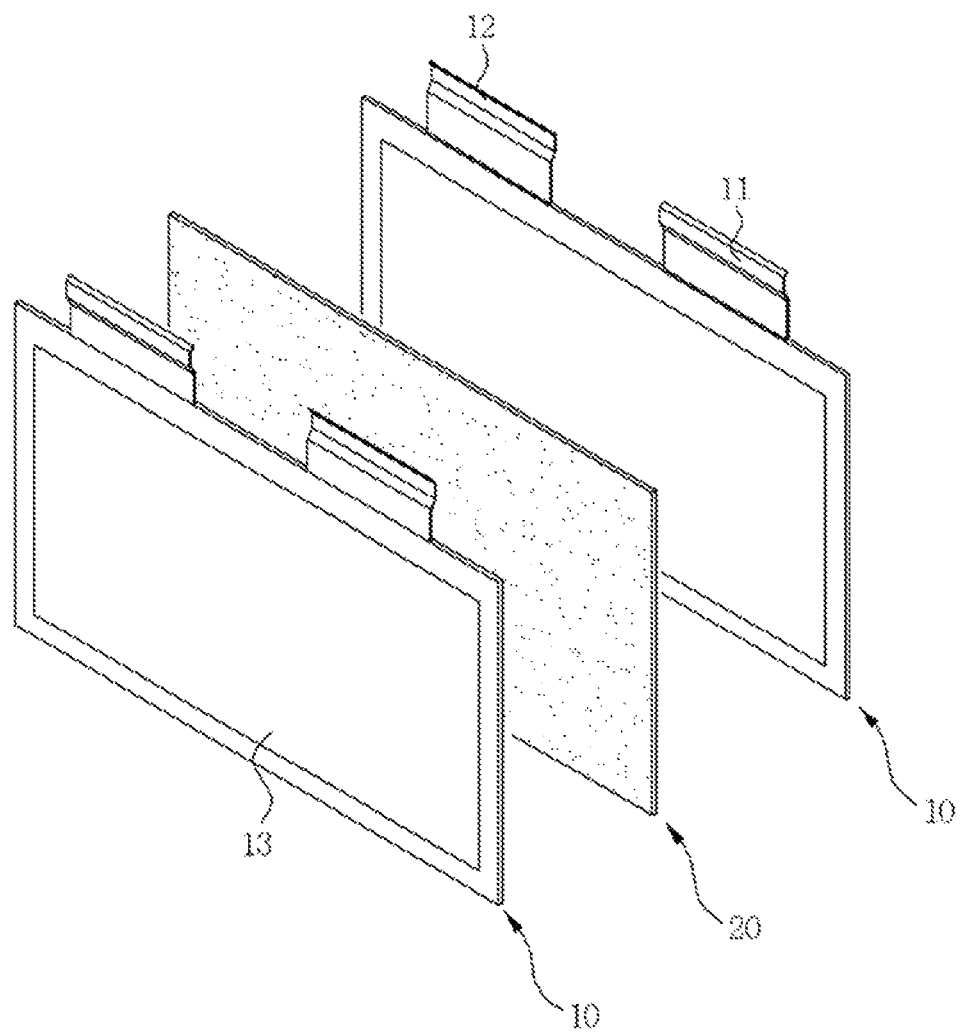
FIG. 3 is an exploded perspective view illustrating unit cells and an adhesive pad disposed between the unit cells according to one embodiment.
Figure 4:
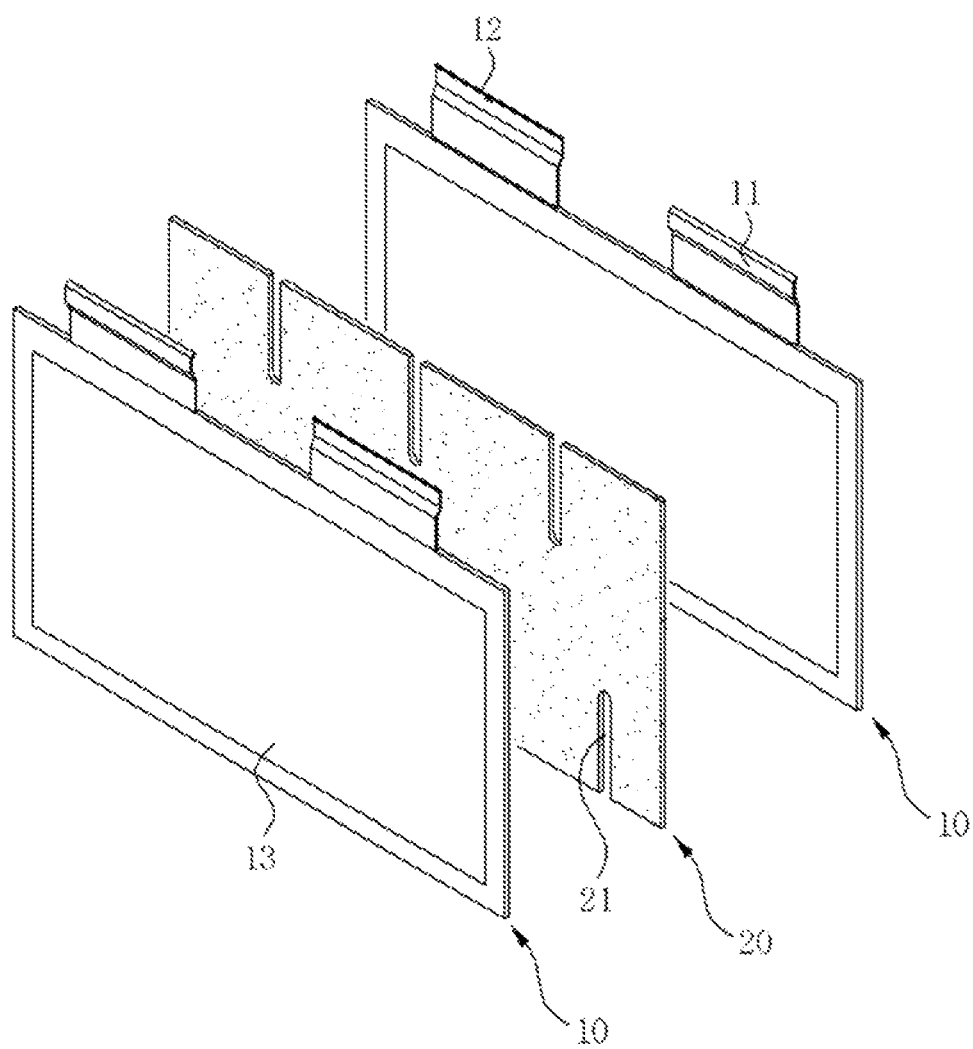
FIG. 4 is an exploded perspective view illustrating an adhesive pad disposed between unit cells according to another embodiment.
Figure 5:
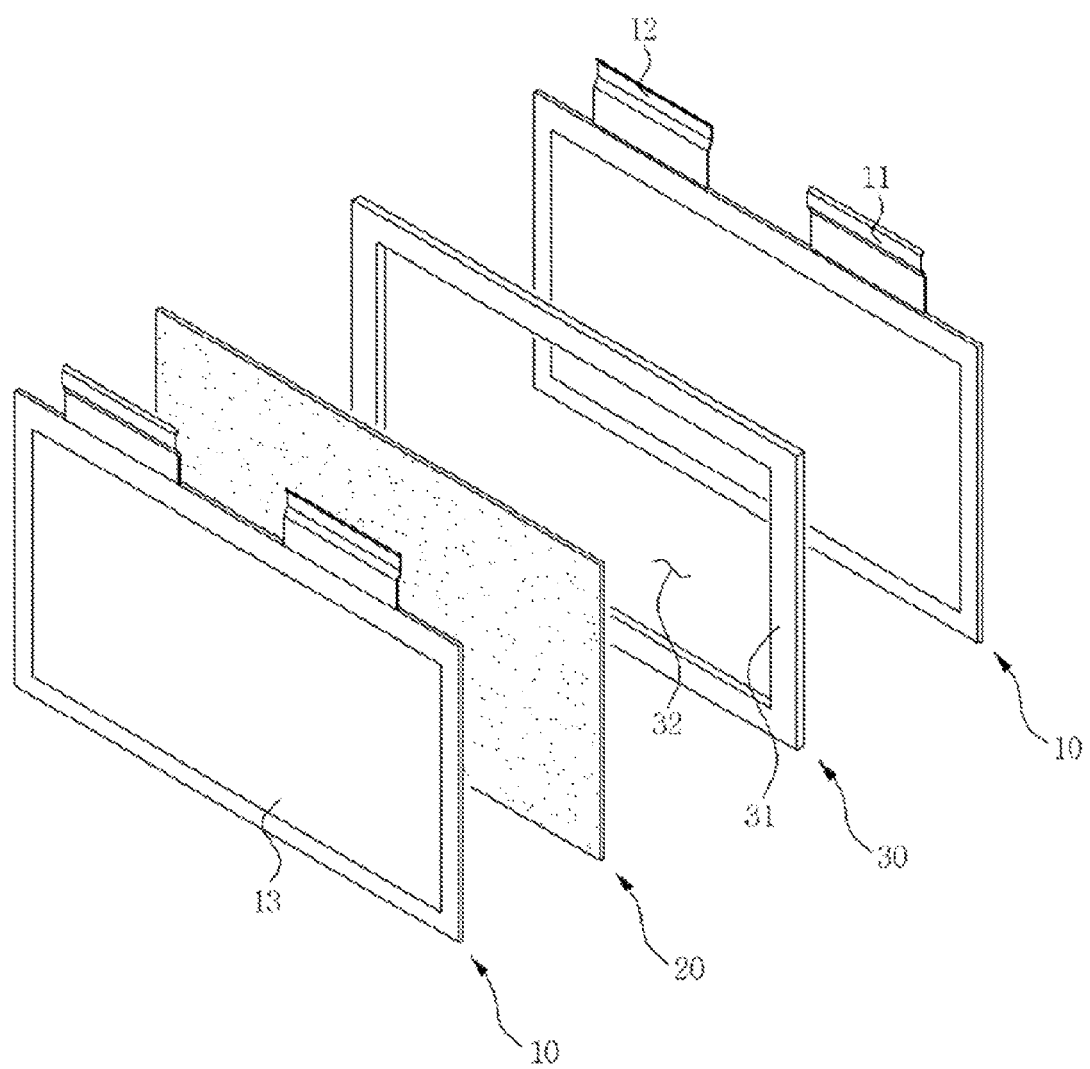
FIG. 5 is an exploded perspective view illustrating a unit cell according to a further embodiment.

FIG. 1 is a perspective view illustrating a secondary battery module according to one embodiment; FIG. 2 is a perspective view illustrating a unit cell of the secondary battery module according to one embodiment; FIG. 3 is an exploded perspective view illustrating unit cells and an adhesive pad disposed between the unit cells according to one embodiment; FIG. 4 is an exploded perspective view illustrating an adhesive pad disposed between unit cells according to another embodiment; and FIG. 5 is an exploded perspective view illustrating a unit cell according to a further embodiment.

A secondary battery module 1 according to one embodiment of the present invention includes a plurality of unit cells 10, in which at least one or more unit cells is stacked in a surface contact manner, and an adhesive pad 20 disposed between contact surfaces 13 of the stacked unit cells.

As illustrated in FIG. 1, the secondary battery module according to one embodiment of the present invention can be formed by stacking at least one or more unit cells 10. When stacking unit cells 10, first electrode terminals 11 and second electrode terminals 12 of the unit cells that are used for electrical connection are alternately arranged.

The unit cell 10 may be a secondary battery such as a lithium secondary battery or a nickel-hydrogen secondary battery. The nickel-hydrogen secondary battery is a secondary battery in which an anode is made of nickel, a cathode is made of a hydrogen-absorbing alloy, and an electrolyte is an alkali aqueous solution. Since the nickel-hydrogen secondary battery has large capacity per unit volume, it can be used not only as an energy source for an electric vehicle (EV) or a hybrid vehicle (HEV) but also for an energy storage device. In addition, the lithium secondary battery is manufactured by using a metal oxide such as $LiCoO_2$ as an anode active material and a carbon material as a cathode active material, interposing a porous polymer separator disposed between the anode and the cathode, and filling a gap between the anode and the cathode with a non-aqueous electrolyte liquid containing a lithium salt such as $LiPF_6$. Lithium ions are released from the anode active material and move into the carbon layer of the cathode during a charging operation, and conversely lithium ions are released from the carbon layer and move into the anode active material during a discharging operation. The non-aqueous electrolyte liquid serves as a medium through which the lithium ions can move between the anode and the cathode.

The unit cell 100 may be packaged to be a pouch-type battery that includes an electrode assembly and a pouch-shaped case which surrounds and seals the electrode assembly therein, or a prismatic battery.

The pouch-shaped case may be manufactured by coating a metal sheet such as an aluminum sheet with an insulation material. For example, modified polypropylene which is a polymer resin, such as casted polypropylene (CPP), is heat-cured to be coated on an aluminum sheet, and then a resin such as polyethylene terephthalate (PET) or nylon may be formed on the outer surface of the modified polypropylene. The structure described above is provided only for illustrative purposes of the embodiment of the present invention, and those skilled in the art will appreciate that the structure described above can be appropriately modified, selected, or applied according to shapes or kinds of batteries.

As illustrated in FIGS. 1 and 2, at least one or more unit cells 10 are stacked to form the battery module 10. To make the secondary battery module 1, formed by stacking at least one or more unit cells 10, compact, the unit cell may be formed using a secondary battery that has a small thickness, a wide width, and a long length. A first electrode portion 11 and a second electrode portion 12 that serve as electrode terminals protrude from one side of the unit cell 10 and are distanced from each other. Alternatively, although not illustrated, the first electrode portion 11 and the second electrode portion 12 may be arranged at opposite sides of the unit cell, respectively. The electrode assembly may be provided within a pouch case that is made of an aluminum laminate sheet.

As illustrated in FIG. 3, the adhesive pad 20 may be disposed between at least one or more stacked unit cells 10 in a manner of being tight contact with the stacked unit cells 10. When there is a fin gap between the contact surfaces 13 of the unit cells 10, air may be introduced into the secondary battery module 1. This may result in deterioration in operation performance of the secondary battery or is likely to cause ignition or explosion of the second battery. Therefore, the adhesive pad 20 is inserted between the contact surfaces 13 of the unit cells 10 when the unit cells 10 are stacked on each other to enhance adhesion between the contact surfaces 13 of the unit cells 10 that face each other. The adhesive pad 20 may be a flexible member made of a polymer material. Stable strong adhesion between the contact surfaces 13 of the unit cells 10 can be obtained by pressing the contact surfaces 13 of the unit cells 10 with the adhesive pad interposed, with uniform force. In addition, the use of a double-sided adhesive tape as the adhesive pad 20 may improve reliability of adhesion between the unit cells 10. The adhesive pad 20 not only enhances adhesion between the contact surfaces 13 of the unit cells 10 but also prevents risk of ignition or explosion of the secondary battery module by eliminating even a fine gap between the contact surfaces 13 of the unit cells 10 that conic into contact with each other and thus by preventing air from externally entering into the secondary battery module 1. The adhesive pad 20 may be made of an elastic material with adhesiveness. As the adhesive pad 20, a single pad may be used solely. Alternatively, a combination of a double-sided adhesive tape and a polymer pad may also be used.

As illustrated in FIG. 4, the adhesive pad 20 may have at least one or more anti-bubble holes 21 in order to prevent air from entering into the secondary battery module through a fine gap between the contact surfaces 13 when the unit cells 10 are stacked or to prevent voids from being formed between the contact surfaces 13 due to air that is introduced when the unit cells 10 are stacked. The anti-bubble hole 21 is formed to linearly extend inward by a predetermined length from the outer end of the adhesive pad 20. However, the shape and arrangement of the anti-bubble holes 21 are not limited thereto. The number of anti-bubble holes 21 may be determined within a suitable range that ensures tight adhesion between the contact surfaces 13 of the unit cells 10 that are stacked.

As illustrated in FIG. 5, a partition member 30 may be included to ensure precise alignment of the unit cells 10 in a thickness direction when the unit cells 10 are stacked. As illustrated in FIG. 3, the partition member 30 is disposed between the contact surfaces 13 of the unit cells 10 which come into contact with each other to guide and position the unit cells 10 so that the unit cells 10 can be precisely aligned when the unit cells 10 are stacked. The partition member 30 has a hole 32 in the center so that it may have a rectangular frame shape having an outer frame 31. The shape of the frame of the partition member may be changed according to the shape of the unit cell 10. In addition, the partition member 30 and the adhesive pad 20 may be unified to be a single body. In this case, the adhesive pad 20 may be provided only within the hole 32 of the partition member 30. That is, the adhesive pad 20 may be not provided in a portion where the frame 31 of the partition member 30 is formed so that the adhesive pad 20 may be in contact with the contact surfaces 13 of the stacked unit cells 10. Since the adhesive pad 20 is used for the purpose of preventing a void or gap from being formed between the unit cells 10 when the unit cells 10 are stacked, it may be suitably made of a flexible material so that it can come into tight contact with the partition member 30 as well as the contact surfaces 13 of the unit cells 10.

Although the present invention has been described in detail with reference to specific embodiments, those embodiments are provided only for illustrative purposes. Therefore, the secondary battery module of the present invention is not limited to those embodiments, but rather those skilled in the art will appreciate that various modifications, additions and substitutions are possible, without departing from the scope and spirit of the invention as disclosed in the accompanying claims.

Further, simple changes and modifications of the present invention are appreciated as included in the scope and spirit of the invention, and the protection scope of the present invention will be defined by the accompanying claims.

DESCRIPTION OF THE REFERENCE NUMERALS IN THE DRAWINGS

1: secondary battery module
10: unit cell
11: first electrode terminal
12: second electrode terminal
13: contact surface
20: adhesive pad
21: anti-bubble hole
30: partition member
31: frame
32: hole

The invention claimed is:

1. A secondary battery module comprising:
a first unit cell and a second unit cell, each unit cell having a contact surface;
a partition member disposed between the first and second unit cells, the partition member having a frame; and
an adhesive pad disposed only within the frame of the partition member so that the frame completely surrounds the adhesive pad;
wherein the adhesive pad is coextensive and in contact with the contact surface of the first and second unit cells.

2. The secondary battery according to claim 1 wherein the adhesive pad is made of an elastic material.

3. The secondary battery module according to claim 1, wherein the shape of the partition member has a shape matching the shape of the unit cells.

4. The secondary battery module according to claim 1, wherein the adhesive pad comprises at least one anti-bubble hole.

5. The secondary battery module according to claim 4, wherein the at least one anti-bubble hole linearly extends inward by a predetermined length from an edge of the adhesive pad.

6. A secondary battery module comprising:
  unit cells stacked; and
  an adhesive pad disposed between two consecutive unit cells in contact with contact surfaces of the stacked unit cells;
  wherein the adhesive pad comprises a plurality of anti-bubble holes, and each anti-bubble hole linearly extends inward by a predetermined length from an edge of the adhesive pad.

7. The secondary battery module according to claim 6, wherein the anti-bubble holes are distanced from each other in the contact surfaces of the unit cells.

8. The secondary battery module according to claim 6, wherein at least one unit cell has a first electrode terminal that protrudes from one side thereof and a second electrode terminal that is distanced from the first electrode terminal and is formed at the same side from which the first electrode protrudes.

* * * * *